US012181867B2

(12) United States Patent
Saegusa et al.

(10) Patent No.: US 12,181,867 B2
(45) Date of Patent: Dec. 31, 2024

(54) WORK MACHINE (71) Applicant: HITACHI CONSTRUCTION MACHINERY CO., LTD., Tokyo (JP)

(72) Inventors: Takashi Saegusa, Tokyo (JP); Yuuki Nagaoka, Ibaraki (JP); Takafumi Morimoto, Ibaraki (JP); Yutaka Watanabe, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 328 days.

(21) Appl. No.: 17/780,108

(22) PCT Filed: Mar. 11, 2021

(86) PCT No.: PCT/JP2021/009700
§ 371 (c)(1),
(2) Date: May 26, 2022

(87) PCT Pub. No.: WO2021/187290
PCT Pub. Date: Sep. 23, 2021

(65) Prior Publication Data
US 2022/0413488 A1 Dec. 29, 2022

(30) Foreign Application Priority Data

Mar. 16, 2020 (JP) ................................. 2020-045497

(51) Int. Cl.
*G05D 1/00* (2024.01)
*E02F 9/20* (2006.01)
(Continued)

(52) U.S. Cl.
CPC ........... *G05D 1/0016* (2013.01); *E02F 9/205* (2013.01); *E02F 9/267* (2013.01); *G05D 1/0022* (2013.01); *H04W 4/40* (2018.02)

(58) Field of Classification Search
CPC .................................. E02F 9/205; E02F 9/267
See application file for complete search history.

(56) References Cited

U.S. PATENT DOCUMENTS 5,961,560 A   10/1999   Kemner
2002/0103623 A1   8/2002   Hasegawa et al.
(Continued)

FOREIGN PATENT DOCUMENTS

CN   101977351 A   2/2011
CN   106912002 A   6/2017
(Continued)

OTHER PUBLICATIONS

International Search Report of PCT/JP2021/009700 dated Jun. 8, 2021.
(Continued)

*Primary Examiner* — Imran K Mustafa
(74) *Attorney, Agent, or Firm* — MATTINGLY & MALUR, PC (57) ABSTRACT

A controller of a work machine includes: a service request generation unit that generates and transfers information for requesting a remote service; a service execution condition management unit that confirms and manages the condition for executing the remote service; and an operating mode management unit that manages the operating mode and the operation status of the work machine. The service request generation unit generates service request information containing function types of a plurality of remote services, the operating mode of the vehicle, and the communication performance of the communication network, and transfers it to the data center. For each function type included in the service request information, the service execution condition management unit outputs service execution information containing the execution possibility, the condition for oper-
(Continued)

ating mode, and the condition for communication performance.

5 Claims, 9 Drawing Sheets

(51) Int. Cl.
*E02F 9/26* (2006.01)
*H04W 4/40* (2018.01)

(56) References Cited

U.S. PATENT DOCUMENTS

| | | | |
|---|---|---|---|
| 2019/0025787 A1 | 1/2019 | Yakushi | |
| 2021/0125496 A1* | 4/2021 | Jornod | G05D 1/0027 |
| 2022/0178111 A1* | 6/2022 | Nanbu | E02F 9/2066 |

FOREIGN PATENT DOCUMENTS

| | | | |
|---|---|---|---|
| CN | 108605173 A | 9/2018 | |
| JP | 11134027 A | 5/1999 | |
| JP | 2018012951 A | 1/2018 | |
| JP | 2020-2709 A | 1/2020 | |
| WO | 2019189888 A1 | 10/2019 | |

OTHER PUBLICATIONS

Chinese Office Action received in corresponding Chinese Application No. 202180006875.0 dated Feb. 3, 2023.
Korean Office Action received in corresponding Korean Application No. 10-2022-7017814 dated Nov. 27, 2023.

* cited by examiner

| Information type | | | Content |
|---|---|---|---|
| Requested content [Function ID] | | | 1. Calibration B [1002] |
| | | | 2. Calibration A [1001] |
| Operating mode (Detail ID) | | | Internal control mode |
| Communication performance | In-vehicle network | Transmission band (107a) | 50 kbps |
| | | Transmission band (107b) | 30 kbps |
| | Out-of-vehicle network | Radio field intensity | Intensity 2 |
| | | Transmission band | 4 Mbps |
| | | Error rate | |

FIG. 5

| Remote service | | Operating mode | | | |
|---|---|---|---|---|---|
| | | Internal control mode<br>Computerized construction | Internal control/external reference mode<br>Construction mode | External control mode<br>Maintenance mode | |
| (a) Operation log confirmation | | Satellite/mobile radio<br>[≧1kbps] | | | |
| (b) Error analysis | | Satellite/mobile radio<br>[≧1Mbps] | | | |
| (c) Calibration | Function A | Non-executable | | Mobile radio<br>[≧1Mbps] | |
| | Function B | | | Mobile radio<br>[≧5Mbps] | |
| (d) Guidance | Function A | | Non-executable | Mobile radio<br>[≧2Mbps] | |
| | Function B | | Mobile radio<br>[≧10Mbps] | | |

| | Items | Content | |
|---|---|---|---|
| Requested content | Requested content [Function ID] | 1. Calibration B [1002] | 610-1 |
| | | 2. Calibration A [1001] | |
| Determination result | Execution determination (General) | Non-executable | 610-1 |
| | Operating mode | Non-executable | 610-2 |
| | Communication performance | Executable | 610-3 |
| | Service reception | Non-executable (Exceeding executable number in site) | |
| Execution conditions | Operating mode | Internal control/external reference mode | 611-1 |
| | Communication performance | Mobile radio, 5 Mbps or more | |
| | Service reception | Number of execution in site, 3 or less | |
| | Execution order | [1001]->[1002] | 611-2 |
| | Execution time | Today, 11:00 | |
| | Necessary time | 30 ~ 60 min | |

WORK MACHINE

TECHNICAL FIELD

The present invention relates to work machines.

BACKGROUND ART

Work machines such as construction machines have been required to support advanced construction functions developed based on the IoT technology such as computerized construction to improve the work efficiency, Work machines have a long maintenance period, meaning that it is necessary to upgrade their construction functions mainly with the controller and the in-vehicle communication network installed at the time of shipment. It is therefore essential for the controller to connect to external devices and information infrastructure via a communication network to enhance their functions.

Currently, automation of work machines is progressing, and as autonomous work using sensors and actuators of the machine itself increases, opportunities for adjustment and setting increase due to individual differences of the machine, the ways of operations and the environment. Moreover, as the functions advance, the parameters to be adjusted and set increase in number and become more complicated.

It is difficult for the operator of the work machine to perform all of these adjustments and settings, and maintenance services by specialists are essential. However, the conventional method of dispatching specialists to the site takes a huge amount of manpower and time to adjust and set all the work machines in the site. A remote service therefore is essential to perform the maintenance services remotely.

The current remote service is started simply by the operator's judgment. In this case, interruption and retry may occur depending on the working condition of the machine and environmental factors, which causes a lot of time loss. This time loss directly leads to the increase in non-operational time of the work machine. Thus, in order to enhance the work efficiency, which is the most important matter in the operation of work machines, it is essential to complete the remote service in the shortest possible time.

To reduce the interruption and retry of remote services and execute the remote services in a short time, a lot of data collected and used by the controller has to be transferred smoothly over the in-vehicle communication network, and the data has to be transferred without delay to the outside of the site over the out-of-vehicle communication network such as satellite communication or mobile radio.

It is also important to keep the work machine in proper working condition and to keep specialists to be assigned to the service in the remote site.

JP H11-134027 A, for example, is known as a conventional technology for such remote services. A system of this conventional technology includes: a queue manager on each mobile machine; and a service manager on each mobile machine configured to generate a service request signal in response to a status of the mobile machine. The system also includes a resource manager configured to establish and control an access to the service resource, and the resource manager is configured to receive the service request signal and allow the mobile machine to access the service resource as a function of the status of each mobile machine.

CITATION LIST

Patent Literature

Patent Literature 1: JP H11-134027 A

SUMMARY OF INVENTION

Technical Problem

The technology described in Patent Literature 1, however, does not consider changes in the communication performance of the in-vehicle communication network and the out-of-vehicle communication network, and it is difficult for the technology to reduce the frequency of remote service interruptions and retries that occur due to tight communication capacity during the processing of other functions or deterioration of transmission conditions.

The technology also does not consider the operating condition of the work machine and the remote service provision condition at the remote site, making it difficult to reduce the frequency of remote service interruptions and retries that occur because of inappropriate operating condition of the work machine or when the remote service cannot be provided.

In view of the above problems, the present invention aims to provide a work machine capable of reducing the frequency of remote service interruptions and retries that occur because of changes in the communication network performance or depending on the operating state of the work machine and the service provision state.

Solution to Problem

To solve the above problems, a work machine of the present invention includes a controller that is connectable to a first communication network for a communication with outside of the work machine. The controller generates service request information having: a function type corresponding to each of a plurality of remote service functions to remotely operate the work machine and refer to internal information of the work machine; an operating mode indicating an operation state of the work machine; and a first communication performance measured at the first communication network, and transfers the generated service request information to outside of the machine via the first communication network, and receives service execution information from outside of the machine via the first communication network, the service execution information having: execution possibility of a service function corresponding to a function type included in the service request information; a condition for the operating mode that permits execution of a service function corresponding to a function type included in the service request information; and a condition for communication performance that permits execution of a service function corresponding to a function type included in the service request information.

Advantageous Effects of Invention

The major aspect of the present invention prevents interruptions and retries of the work in advance due to the working condition of the work machine, environmental factors, the status of the entire work site, or the status of the remote site, and thus shortens non-operating time of the work machine. This also reduces interruptions and retries of the provision of functions that may occur at the remote service provider, and thus provides a remote service that enables frequent adjustments and settings with a small number of personnel in the entire work site. Further features of the present invention will be clearer from the following descriptions and the attached drawings. Other problems, configurations and advantageous effects also will be clear from the following descriptions of the embodiment.

DESCRIPTION OF EMBODIMENTS

The following describes a mode to implement the present invention (referred to as an embodiment) in details, with reference to the drawings as needed.

The following embodiment has a plurality of the same components, and letters (a, b, . . . ) may be added to the end of their reference numbers to distinguish between them. If no distinction is necessary, the description is given without the addition of letters.

EXAMPLE 1

Figure 1:
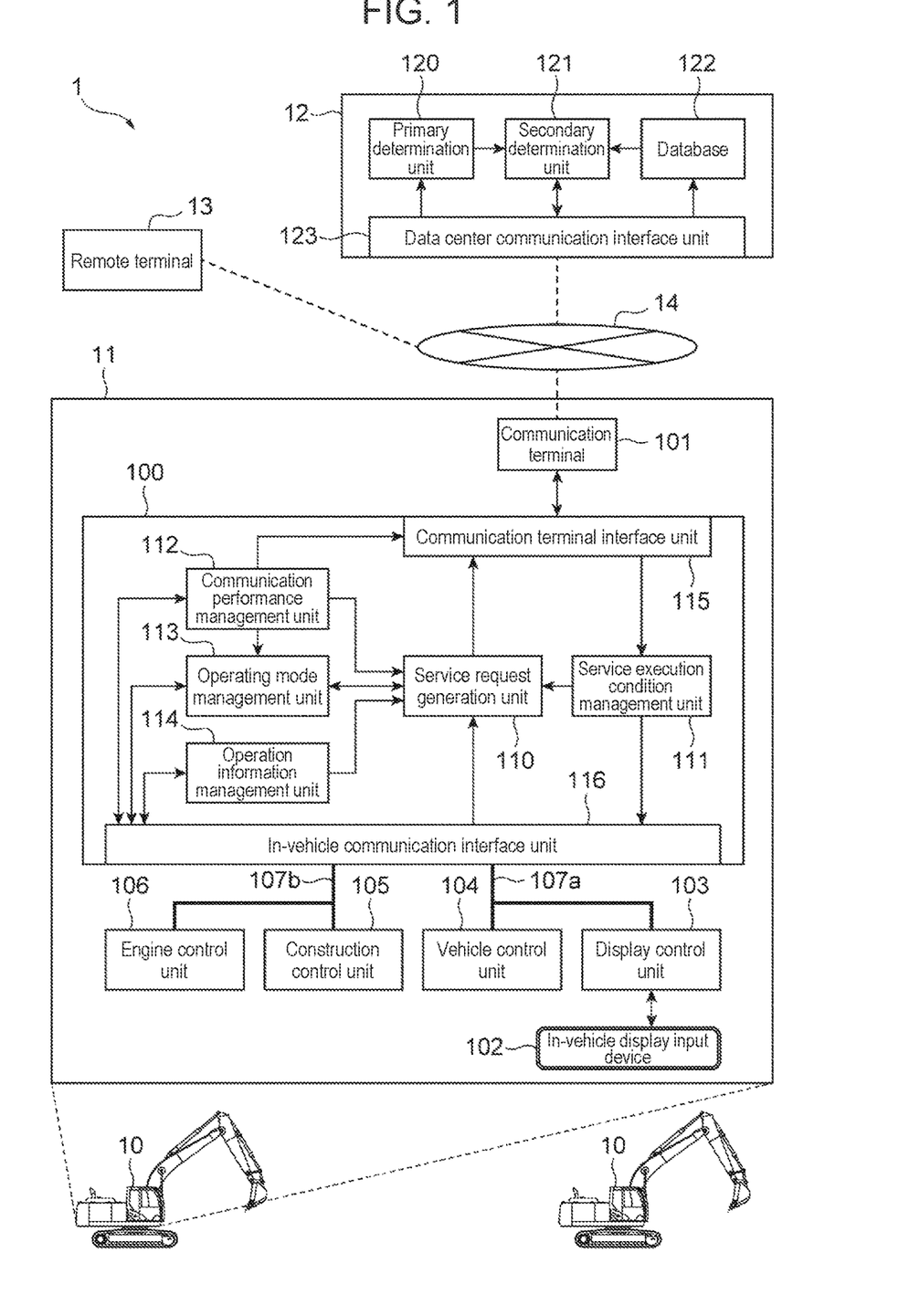
FIG. 1 describes the configuration of Example 1 that is a remote service system including a work machine according to the present embodiment.

FIG. 1 describes the configuration of Example 1 that is a system for remote service (hereinafter a remote service system) including a work machine 10 according to the present embodiment.

The remote service system 1 for the work machine 10 of this embodiment includes a controller 11 mounted on the work machine 10, a data center 12, and a remote terminal 13. In one example, the work machine 10 is a construction machine used at construction sites. The controller 11 includes an out-of-vehicle communication network (first communication network) 14 that connects the controller 11 and the data center 12. and the data center 12 and the remote terminal 13.

The controller 11 includes an information control unit 100 that transmits and receives information inside and outside the vehicle via communications, a communication terminal 101 that is connected to the information control unit 100 and executes communication processing with the data center 12 via the out-of-vehicle communication network 14, an in-vehicle display input device 102, a display control unit 103 that is connected to the in-vehicle display input device 102 and executes the output processing of a display screen that is output from the in-vehicle display input device 102, a vehicle control unit 104 that executes control of the vehicle body such as room lights and wipers, a construction control unit 105 that controls the construction work using the boom, the bucket, and the like of the work machine 10, and an engine control unit 106 that controls the engine.

The controller 11 also includes connection lines that are an in-vehicle communication network 107a that connects the information control unit 100, the display control unit 103, and the vehicle control unit 104, and an in-vehicle communication network 107b that connects the information control unit 100, the construction control unit 105, and the engine control unit 106.

The information control unit 100 includes a service request generation unit 110 that generates and transfers a request for remote services, a service execution condition management unit 111 that receives the execution conditions of a remote service and stores them therein, a communication performance management unit 112 that is connected to the service request generation unit 110 and collects and formats information on various communication performances at the out-of-vehicle communication network 14 and the in-vehicle communication networks 107a and 107b, and stores it therein, an operating mode management unit 113 that is connected to the service request generation unit 110 and manages the operating mode indicating the control state of the entire vehicle, an operation information management unit 114 that is connected to the service request generation unit 110 and collects and formats information on the operation history and stores it therein, a communication terminal interface unit 115 that is connected to the communication terminal 101, the service request generation unit 110, the service execution condition management unit 111, and the communication performance management unit 112, and controls the exchange of data via the out-of-vehicle communication network 14, an in-vehicle communication interface unit 116 that is connected to the service request generation unit 110, the service execution condition management unit 111, the communication performance management unit 112, the operating mode management unit 113, and the operation information management unit 114, and controls the exchange of data via the in-vehicle communication networks 107a and b.

The data center 12 includes a primary determination unit 120 that receives a request for remote service and determines whether or not the remote service is executable based on the information received, a secondary determination unit 121 that determines again the determination result by the primary determination unit 120 about whether or not the remote service is executable, based on the state of other work machines 10 that execute remote services, the work site conditions such as weather conditions, the situation of the service personnel, the past service history, and other conditions, a database 122 that is connected to the secondary determination unit 121, and gathers and stores information transferred from a plurality of work machines 10 via the out-of-vehicle communication network 14 and information transferred from the remote terminal 13 via the out-ofvehicle communication network 14, and a data center communication interface unit 123 that is connected to the primary determination unit 120, the secondary determination unit 121 and the database 122, and controls the exchange of data via the out-of-vehicle communication network 14.

Next, a method of executing a remote service using the controller 11 and the remote service system 1 of this embodiment will be described in order of execution, while referring to FIGS. 2 to 7 as needed. The following describes an example of parameter adjustment (calibration) related to the control of the work machine 10.

Figure 2:
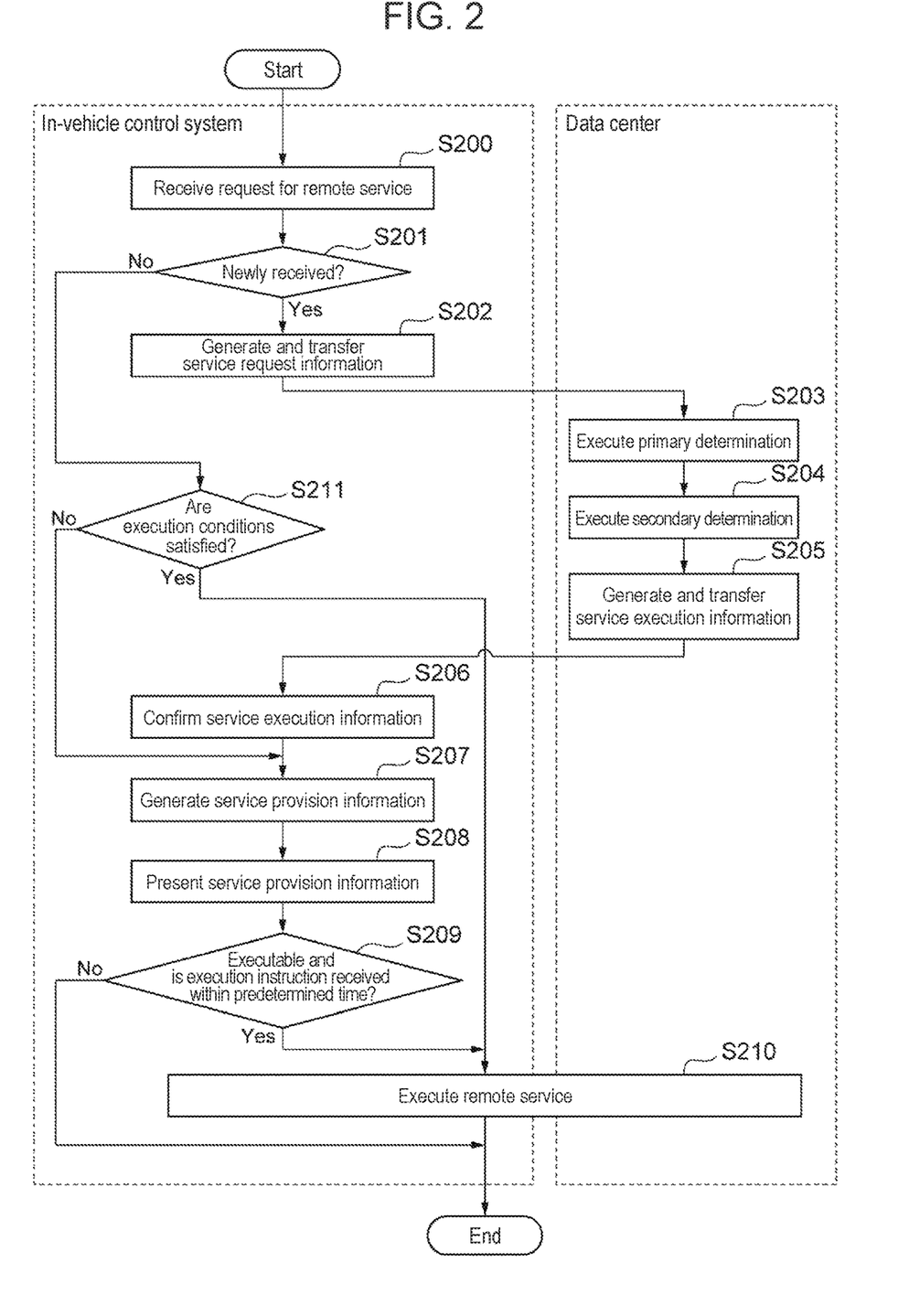
FIG. 2 is a flowchart showing the procedure by the remote service system including the work machine according to the present embodiment.

FIG. 2 is a flowchart showing the procedure by the remote service system 1 including the work machine 10 according to the present embodiment.

First, the controller 11 receives a request for remote service, which is input in response to an instruction from the operator via the in-vehicle display input device 102, or is input triggered by a malfunction of a device such as an actuator mounted on the work machine 10 or the display control unit 103, via the in-vehicle communication network 107a or 107b, where the request is received finally at the service request generation unit 110 (S200).

At this time, the request for remote service contains a requested function indicating the function type of the requested remote service, and it may include a plurality of requested functions.

Next, the service request generation unit 110 of the controller 11 refers to service execution information 600 (FIG. 6) stored in advance in the service execution condition management unit 111 as a result of this procedure performed in the past, and compares the requested function included in the service execution information 600 (for convenience, referred to as past requested function) with the requested function contained in the remote service request received at step 200 (for convenience, referred to as current requested function). If there is a mismatch (S201→Yes), the service request generation unit 110 generates remote service request information 400 that is a new received remote service. The remote service request information 400 is the combination of the current requested function, the communication performances of the out-of-vehicle communication network 14 and the in-vehicle communication networks 107a and 107b acquired by the communication performance management unit 112, and the operating mode managed by the operating mode management unit 113. The service request generation unit 110 transfers the generated information to the data center 12 via the communication terminal 101 (S202). At this time, the service request generation unit 110 may also transfer the minimum operating information stored in the operation information management unit 114 together.

Figure 3:
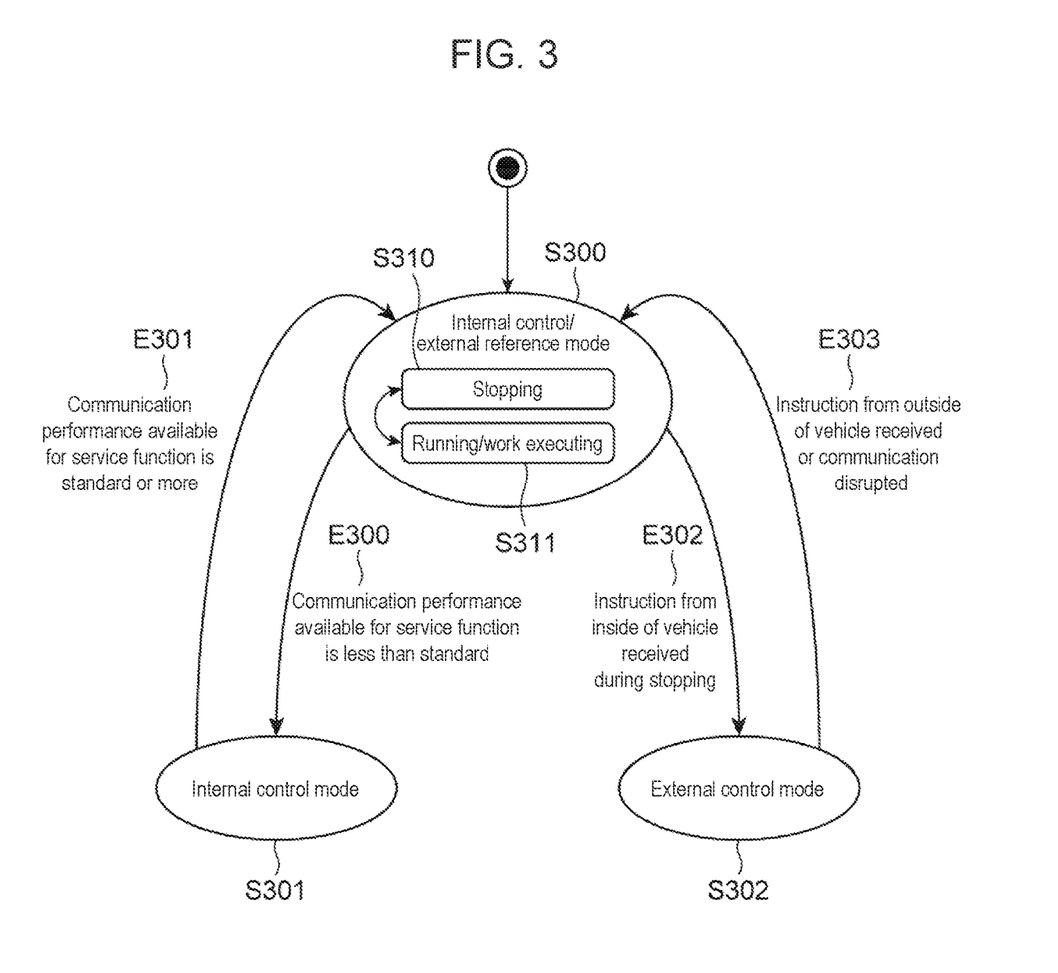
FIG. 3 shows a state transition indicating how the controller of the work machine according to the present embodiment manages the control mode.

The following describes the details of the operating mode, referring to FIG. 3.

FIG. 3 shows a state transition indicating how the controller 11 of the work machine 10 according to the present embodiment manages the control mode.

First, when the controller 11 is activated, the controller 11 controls the operating mode management unit 113 to shift its operating mode to an internal control/external reference mode (S300), so that the work operation can be controlled only by the operator's manipulation, and only the data reference is allowed for an access from the outside of the vehicle.

The internal control/external reference mode (S300) further includes a stopping mode (S310) indicating that the work machine 10 is stopped, and a running/work executing mode (S311) indicating that the work machine 10 is running or work is being executed. The operating mode management unit 113 of the controller 11 shifts the operating mode to the state S310 or the state S311.

At this step, the operating mode management unit 113 shifts the operating mode based on the operation state of the work machine 10 acquired via the in-vehicle communication network 107.

Next, when the operating mode is the internal control/external reference mode (S300), and the communication performance available for the service function is less than a standard (E300), that is, it is determined that either one of the communication performance, which is acquired by the communication performance management unit 112, of the out-of-vehicle communication network 14 and the in-vehicle communication network 107 that is assignable to the remote service is less than a value of the communication performance that is preset therein, the operating mode management unit 113 shifts the operating mode to an internal control mode (S301), where the work operation is controllable only by the operator's manipulation and an access from the outside of the vehicle is disabled.

Next, when the operating mode is the internal control mode (S301), and the communication performance available for the service function is the standard or more, that is, it is determined that either one of the communication performance, which is acquired by the communication performance management unit 112, of the out-of-vehicle communication network 14 and the in-vehicle communication network 107 that is assignable to the remote service is the communication performance that is present therein or more (E301), the operating mode management unit 113 shifts the operating mode to the internal control/external reference mode (S300).

Further, when the operating mode is the internal control/external reference mode (S300) and the stopping mode (S310), and an instruction to change the operating mode is received from the service request generation unit 110, such as an instruction for final execution from the work machine 10 during stopping (E302), the operating mode management unit 113 shifts the operating mode to an external control mode (S302), where the manipulation from the operator for work operation is not accepted, and the work operation can be executed only by an access from the outside of the vehicle.

Next, when the operating mode is the external control mode (S302), and it is determined that an instruction to change the operating mode has been received from the outside of the vehicle via the out-of-vehicle communication network 14 or that a communication via the out-of-vehicle communication network 14 has been disrupted (E303), the operating mode management unit 113 shifts the operating mode to the internal control/external reference mode (S300).

Referring back to FIG. 2 at step 203, the description continues.

Figure 4:
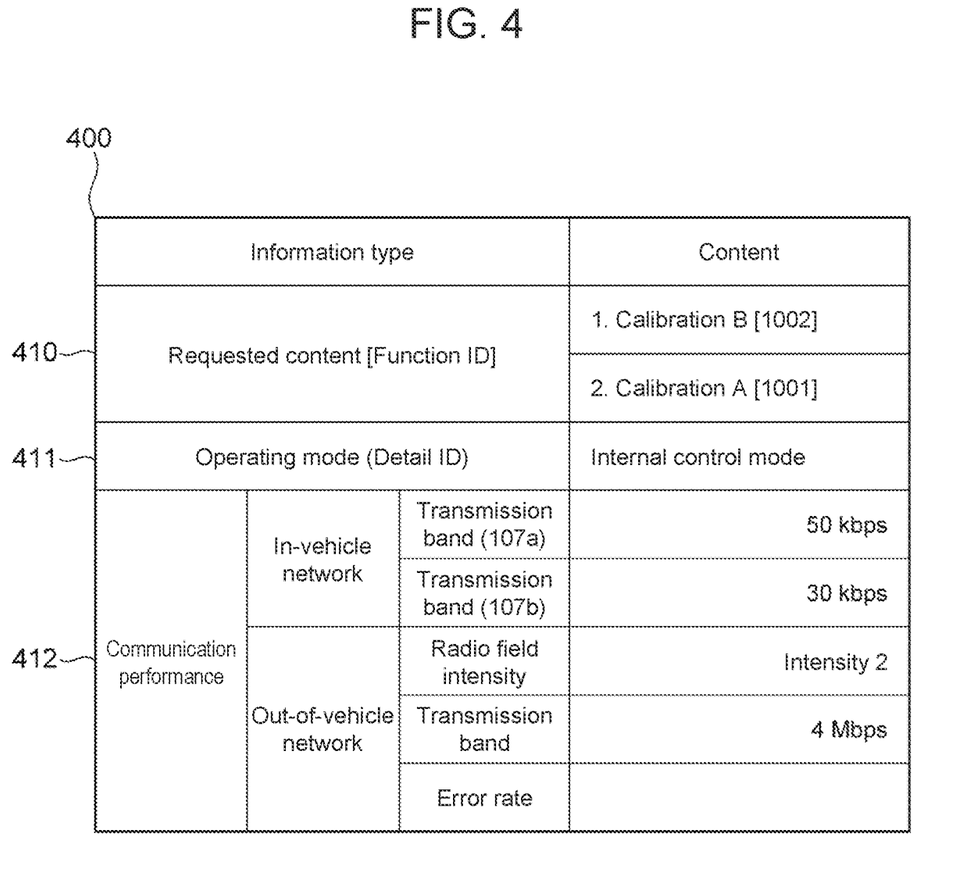
FIG. 4 shows the remote service request information used in the remote service system including the work machine according to the present embodiment.

Details of the remote service request information 400 used at step 203 are described, referring to FIG. 4.

FIG. 4 shows the remote service request information 400 used in the remote service system 1 including the work machine 10 according to the present embodiment.

The remote service request information 400 contains requested content information 410, operating mode information 411, and communication performance information 412. The requested content information 410 contains a requested function included in the request for remote service that is received by the service request generation unit 110. The operating mode information 411 contains the operating mode acquired from the operating mode management unit 113 when the service request generation unit 110 accepts the request for remote service. The communication performance information 412 contains the communication performances of the out-of-vehicle communication network 14 and the in-vehicle communication networks 107a and 107b, which are obtained. from the communication performance management unit 112 when the service request generation unit 110 accepts the request for remote service.

Referring back to FIG. 2, the description continues.

Following step 202, the data center 12 receives the remote service request information 400 transferred from the controller 11, and the primary determination unit 120 executes a primary determination whether or not to execute the remote service using the received remote service request information 400 (S203).

At this step, the primary determination unit 120 compares determination standard setting information 500, which is the reference value set therein for determination, with the received remote service request information 400. If the remote service request information 400 satisfies the reference value of the determination standard setting information 500, the primary determination unit 120 determines executable in the first determination. It does not satisfy the reference value, the primary determination unit 120 determines not executable.

Figure 5:
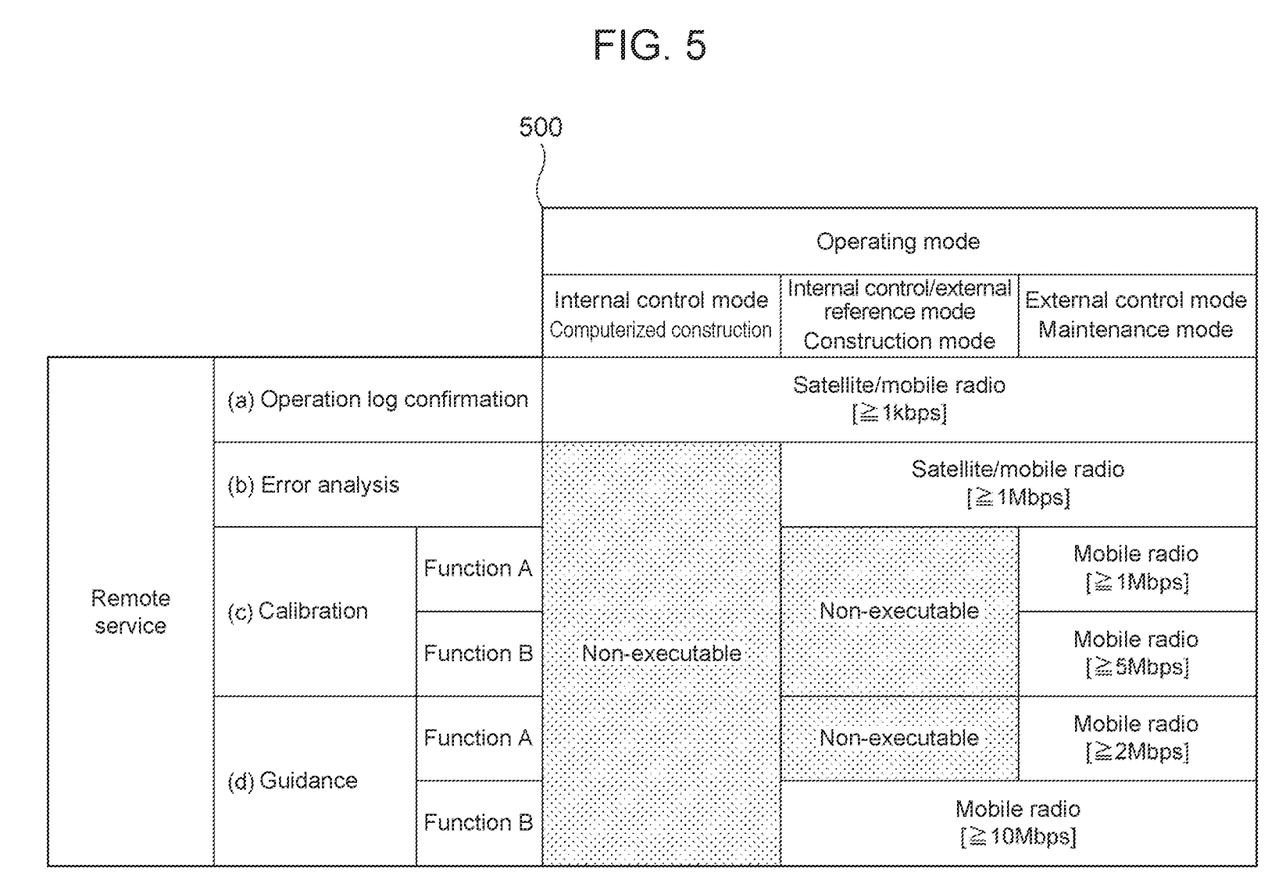
FIG. 5 shows the setting content of the primary determination unit of the remote service system including the work machine according to the present embodiment.

The following describes the determination standard setting information 500 configured at the primary determination unit 120, referring to FIG. 5.

FIG. 5 shows the setting content at the primary determination unit 120 of the remote service system 1 including the work machine 10 according to the present embodiment.

In the determination standard setting information 500, executable and non-executable are set for each function type of remote service (corresponding to each row in FIG. 5), and for each operating mode (corresponding to each column in FIG. 5).

For example, when the function type of the remote service is error analysis and the operating mode is the internal control mode, this case is non-executable, and if the remote service request information 400 meets the condition, the primary determination unit 120 determines non-executable.

When the combination of the functions of the remote service and the operating modes is set executable, the determination standard setting information 500 further sets the communication performance standard.

For example, when the function type of the remote service is calibration and the operating mode is the external control mode, the communication performance standard is that the out-of-vehicle communication network 14 is a mobile radio and the communication rates of the out-of-vehicle communication network 14 and the in-vehicle communication network 107 are 5 Mbps or higher. If the remote service request information 400 meets the condition, the primary determination unit 120 determines non-executable.

Referring back to FIG. 2 at step 203, the description continues.

When step 203 ends, the primary determination unit 120 outputs a plurality of requested functions registered in the requested content information 410 of the remote service request information 400, a first execution possibility indicating whether or not each of the requested functions is executable, and a first execution condition, which is the content of the determination standard setting information 500 set for each of the requested functions to the out-of-vehicle communication network 14.

Next, in the data center 12, the secondary determination unit 121 executes a secondary determination about whether or not the remote service is executable based on the requested function, the status of the work site where the work machine operates from the information on the plurality of work machines 10 stored in the database 122, the status of the remote site where the remote service is to be provided from the information stored in the database 122 and transferred from the remote terminal 13, and the environmental information of the weather condition and the communication infrastructure status (S204).

Specifically, firstly, the secondary determination unit 121 finds: the status of the work site, including the time transition of the current and future number of remote services executed at the entire work site, which is derived from the execution status, execution reservation and execution time of each piece of remote service information for multiple work machines 10 that are stored in the database 122, and the time transition of the current and future maximum number of simultaneous remote services executed, derived from the communication status predicted according to the weather conditions and communication infrastructure conditions stored in database 122; and the status of the remote site, including the time transition of the current and future number of remote services provided at the remote site, which is derived from the provision status, provision reservation and response time of each remote service at the remote site that is stored in the data 122 and transferred from the remote terminal 13, and the time transition of the maximum number of simultaneous responses at the remote site that is stored in the database 122 and transferred from the remote terminal 13.

Next, the secondary determination unit 121 outputs a determination on a second execution possibility as follows: it determines that each requested function is executable if the number of current services executed is less than the maximum number of current services executed based on the status of the work site and if the number of current remote services provided is less than the number of current remote services provided based on the status of the remote site, and it determines that each requested function is not executable if the current number of services executed is equal to or greater than the current maximum number of services executed based on the status of the work site, or if the current maximum number of remote services provided is equal to or greater than the current number of remote services provided based on the status of the remote site.

If any one of the first execution possibility and the second execution possibility is not-executable for each requested function, the secondary determination unit 121 finds the execution time at which the execution of the remote service will be permitted, based on the time transition of the number of future remote service executions that is included in the status of the work site, the maximum number of future service executions, the number of future remote services provided that is included in the status of the remote site, and the maximum number of future remote services provided, and outputs the second execution condition including various conditions used for the finding and the execution time.

At this time, the secondary determination unit 121 may add the execution order that is determined from the execution time of each requested function. To output the second execution condition, the secondary determination unit 121 may request the remote terminal 13 to transfer additional information.

Following step 204, the secondary determination unit 121 combines the requested function, the first execution possibility, the second execution possibility, the first execution condition, and the second execution condition to create service execution information 600, and transfers this to the controller 11 via the out-of-vehicle communication network 14 (S205).

Figure 6:
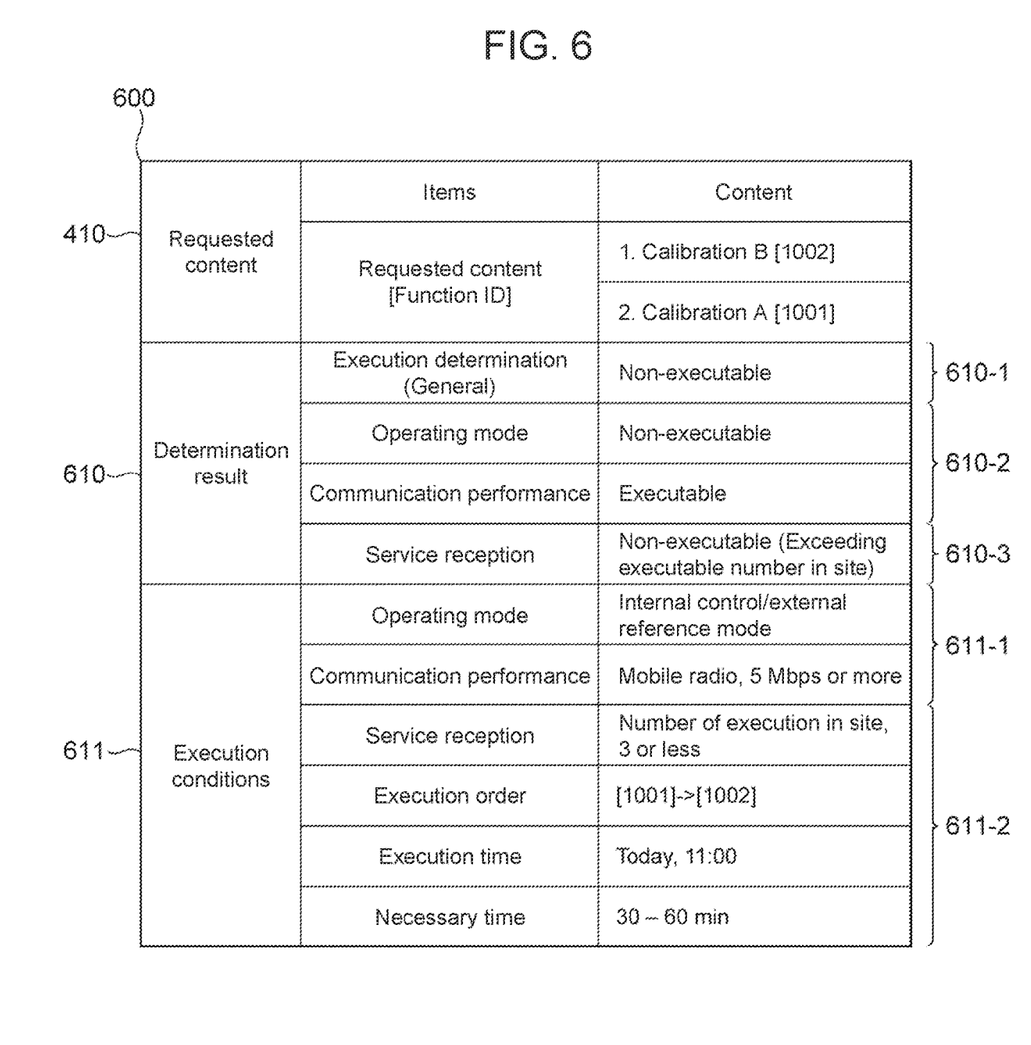
FIG. 6 shows the content of the service execution information used in the remote service system including the work machine according to the present embodiment.

Details of the service execution information 600 are described, referring to FIG. 6.

FIG. 6 shows the content of the service execution information 600 used in the remote service system 1 including the work machine 10 according to the present embodiment.

The service execution information 600 contains the requested content information 410, execution possibility information (determination result) 610, and execution condition information 611. The execution possibility information 610 contains the first execution possibility (corresponding to 610-2 in FIG. 6) and the second execution possibility (corresponding to 610-3 in FIG. 6), and if any one of the first execution possibility and the second execution possibility is non-executable, general determination for execution possibility (corresponding to 610-1 in FIG. 6) will be non-executable, and if not, the general determination will be executable. The execution condition information 611 contains a first execution condition (corresponding to 611-1 in FIG. 6) and a second execution condition (corresponding to 611-2 in FIG. 6).

Referring back to FIG. 2 at step 205, the description continues. Following step 205, the controller 11 makes the service execution condition management unit 111 confirm the content of the received service execution information 600 and stores it in the service execution condition management unit 111 (S206).

At this step, the service execution condition management unit 111 continues to store the information at least until all the remote services corresponding to the stored service execution information 600 are executed and completed.

Next, the service execution condition management unit 111 transfers the service execution information 600, which is transferred via the communication terminal 101 and stored therein, to the display control unit 103. The display control unit 103 creates service provision information, which contains a part of the content of the transferred service execution information 600 and is used for screen outputting to the in-vehicle display input device 102 (S207), and presents the service provision information to be output on the screen of the in-vehicle display input device 102 (S208).

Figure 7:
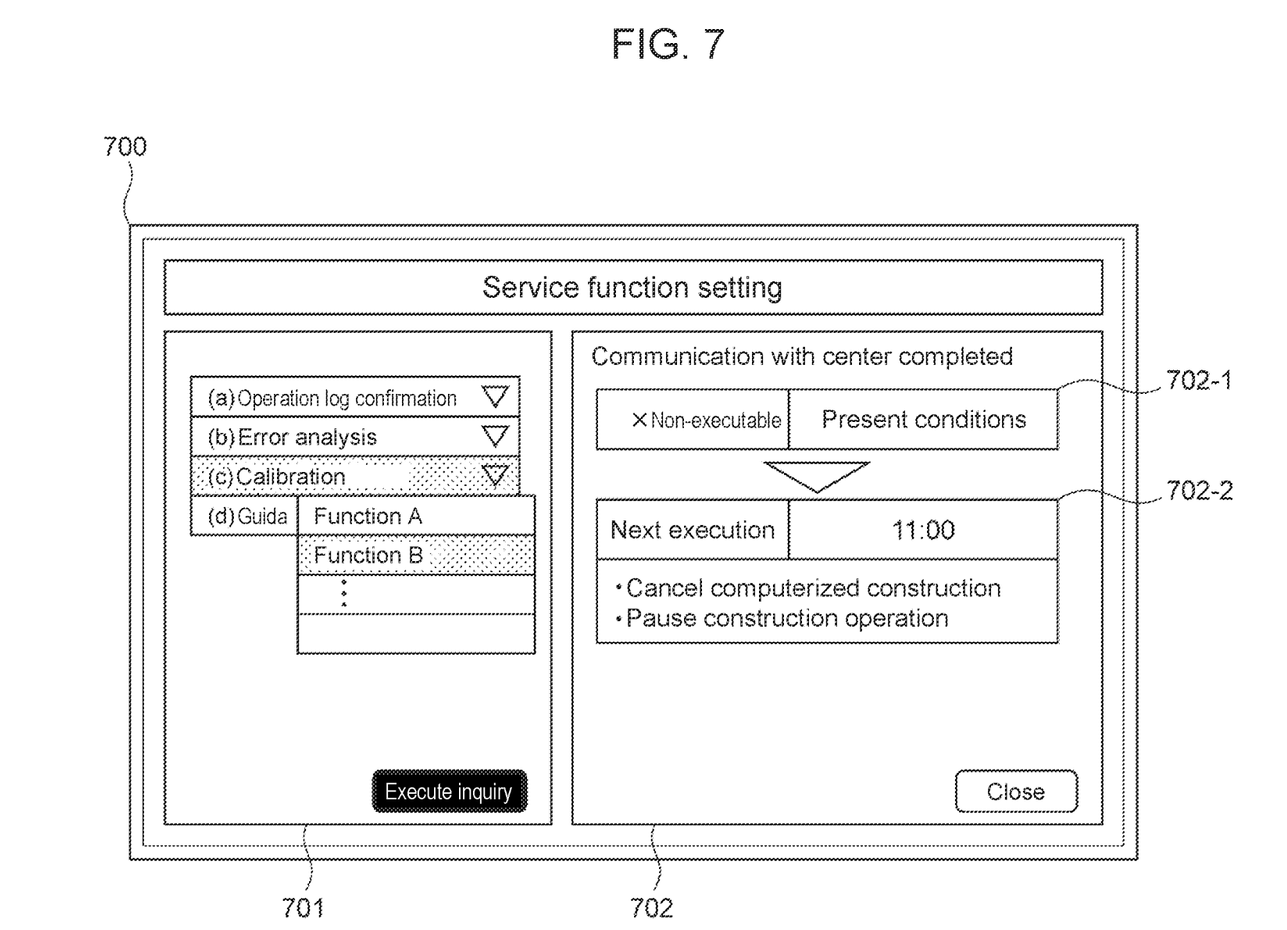
FIG. 7 shows the screen to display the remote service determination result output from the controller of the work machine according to the present embodiment.

Referring to FIG. 7, an example of the service provision information on the output screen 700 of the in-vehicle display input device 102 is described.

FIG. 7 shows the screen to display the remote service determination result output from the controller 11 of the work machine 10 according to the present embodiment.

The output screen 700 includes a remote service request manipulation unit 701 that is a display screen for input to accept a remote service request entered based on an instruction from the operator via the in-vehicle display input device 102 (corresponding to a part of step 200 in FIG. 2), and a service provision information display unit 702, which is a display screen for input to present the service provision information.

In this example, the service provision information includes the general determination in the service execution information 600 about the execution possibility and information for screen display based on the general determination in the service execution information 600 about the execution possibility, which is presented as a part of the service provision information display unit 702 (corresponding to 702-1 in FIG. 7).

The service provision information also includes the execution condition information 611 corresponding to the items that are determined as non-executable in the execution possibility information 610 of the service execution information 600, and information for screen display based on the execution condition information 611, which is presented as a part of the service provision information display unit 702 (corresponding to 702-2 in FIG. 7).

Referring back to FIG. 2 at step 208, the description continues.

Following step 208, if the general determination in the execution possibility information 610 of the service execution information 600 that the service execution condition management unit 111 stores indicates executable and a remote service execution instruction is received within the predetermined time via the in-vehicle display input device 102 (S209→Yes), the service request generation unit 110 of the controller 11 transfers an execution command of the remote service corresponding to the requested information 410 of the service execution information 600 to the data center 12 via the communication terminal 101 to start the execution of the remote service (S210) and ends the procedure when the remote service is completed or interrupted.

In a specific example where the remote service executed in step 210 is calibration of the work machine 10 of this embodiment, the controller 11 fixes its operating mode to the external operating mode so as not to accept an operator's instruction related to the work operation of the work machine 10. Then, the controller 11 rewrites various parameters related to the control of the work machine 10 and received via the communication terminal 101, and makes the work machine 10 operate based on the operating instruction received via the communication terminal 101, thus confirming the effect of adjustment.

Following step 208, if the general determination in the execution possibility information 610 of the service execution information 600 that the service execution condition management unit 111 stores indicates executable and no remote service execution instruction is received within the predetermined time via the in-vehicle display input device 102, or if the general determination in the execution possibility information 610 indicates non-executable (S209→No), the service request generation unit 110 of the controller 11 ends the procedure.

After this, when the conditions of the execution condition information 611 presented in the service provision information display unit 702 of the output screen 700 are satisfied, then the operator desirably re-executes this procedure.

Returning to step 201, the procedure of the controller 11 in this re-execution will be described again.

At step 201, the controller 11 makes the service request generation unit 110 refer to the service execution information 600 that the service execution condition management unit 111 stores and compare the past requested functions with the current requested functions. If all the functions match (S201→No, the re-execution corresponds to the condition of S201→No), the controller 11 determines that this is a remote service request that has been accepted in the past but was not executed, and the procedure proceeds to step 211.

At step 211, the service request generation unit 110 refers to the service execution information 600, which contains the past requested functions that match the current requested functions (referred to as the relevant execution information for convenience), and executes all of the execution determinations including: a first execution determination that is made based on the conditions for the communication performance contained in the execution condition information 611 of the relevant execution information relative to the communication performances of the out-of-vehicle communication network 14 and the in-vehicle communication networks 107a, 107b acquired by the communication performance management unit 112; a second execution determination that is made based on the conditions for the operating mode contained in the execution condition information 611 of the relevant execution information relative to the operating mode managed by the operating mode management unit 113; a third execution determination that is made based on the conditions for the execution order contained in the execution condition information 611 of the relevant execution information relative to a plurality of the current requested functions; and a fourth execution determination that is made based on the conditions for the execution time contained in the execution condition information 611 of the relevant execution information relative to the current time managed by the service request generation unit 110. Then, if the conditions are satisfied for all of the first through four execution determinations (S211→Yes), the procedure starts to execute the remote service corresponding to the current request information (S210), and ends when the remote service is completed or interrupted.

If any one of the first to fourth execution determinations does not satisfy the conditions (S211→No), the procedure replaces the execution possibility information 610 of the relevant execution information with the result of the first to fourth execution determinations, and then proceeds to step 207.

As a result, the procedure creates and presents the conditions that are not satisfied in the first to fourth execution determinations on the output screen 700 (S207, S208). In this case, the requested function is not-executable (S209→No), so that the procedure ends.

Such a determination by the data center 12 makes it possible to determine whether or not the vehicle itself and the surrounding environment such as the work site and the service provider are in an appropriate state before executing the remote service. This therefore prevents interruptions and retries of the work in advance due to the working condition of the vehicle, environmental factors, the status of the entire work site, or the status of the remote site. This contributes to shortening the non-operating time of the work machine. This also reduces interruptions and retries of the provision of functions that may occur at the remote service provider, and thus provides a remote service that enables frequent adjustments and settings with a small number of personnel in the entire work site.

EXAMPLE 2

Figure 8:
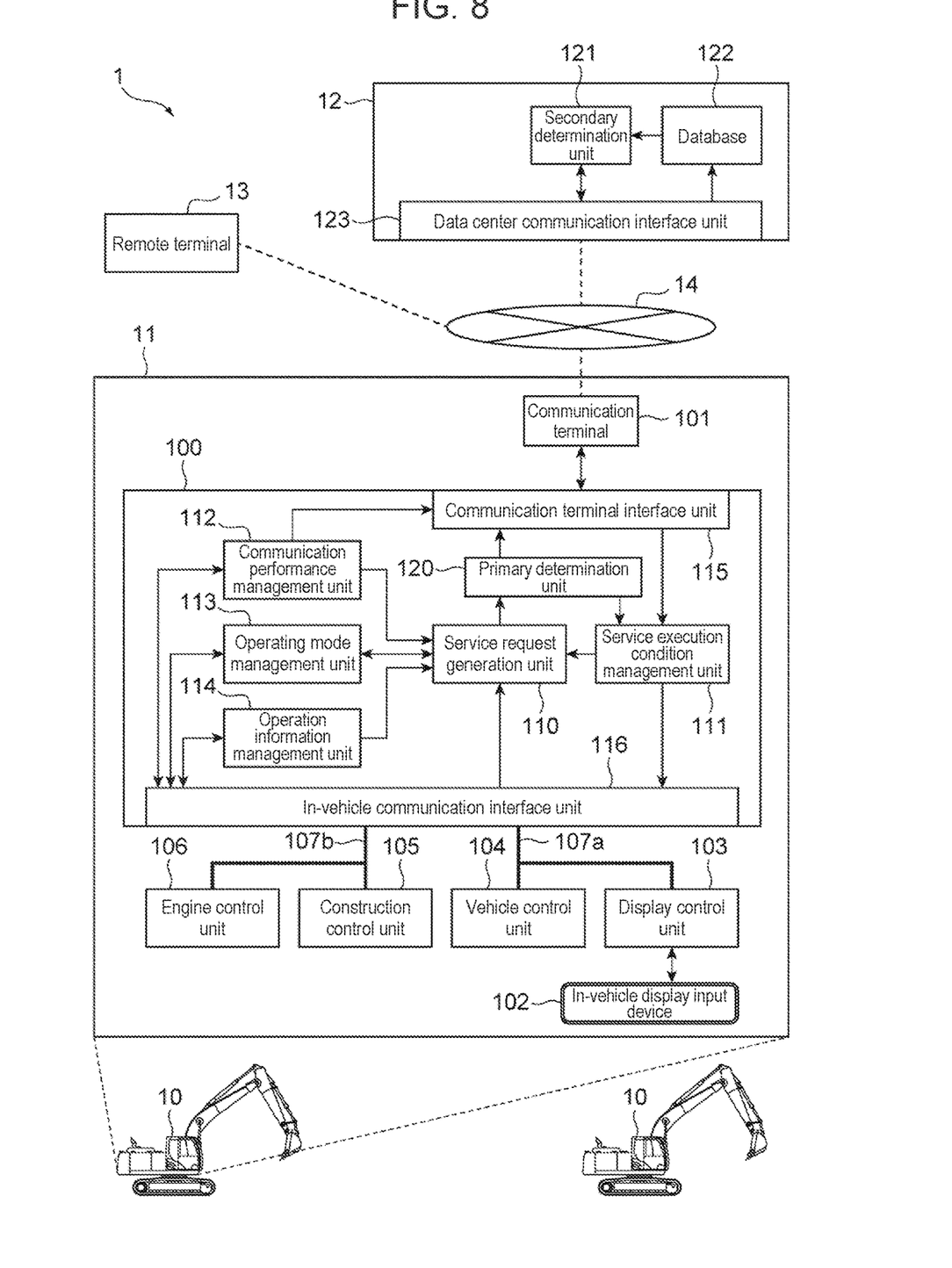
FIG. 8 describes the configuration of Example 2 that is a remote service system including a work machine according to the present embodiment.

FIG. 8 describes the configuration of Example 2 that is a remote service system 1 including a work machine 10 according to the present embodiment.

The present embodiment does not include the primary determination unit 120 in the data center 12 in Example 1, but includes a primary determination unit 120 in the information control unit 100 of the controller 11.

The primary determination unit 120 in this example is connected to the service request generation unit 110, the service execution condition management unit 111, and the communication terminal interface unit 115.

Figure 9:
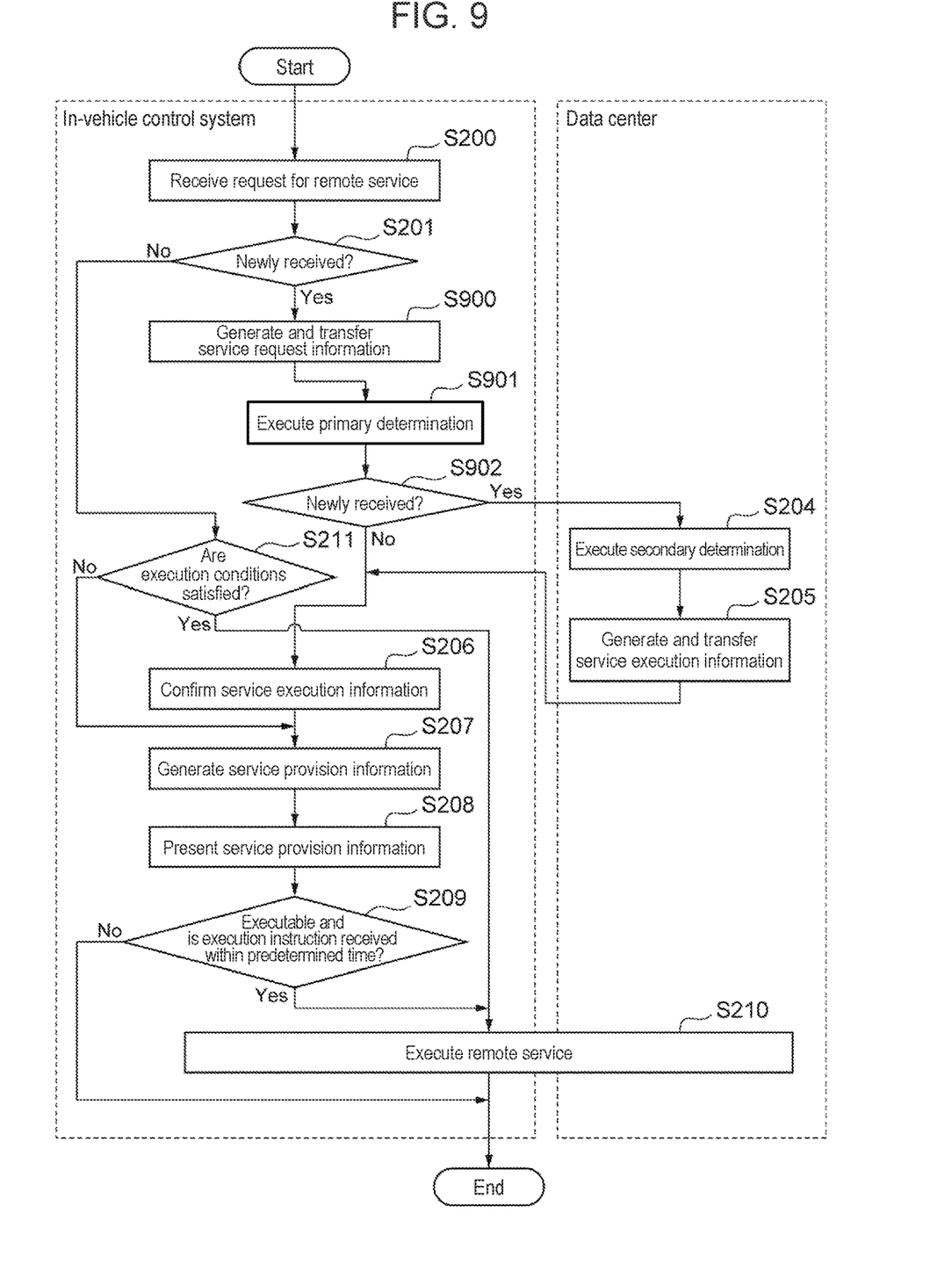
FIG. 9 is a flowchart showing the procedure of Example 2 by the remote service system using the work machine according to the present embodiment.

FIG. 9 is a flowchart showing the procedure of Example 2 by the remote service system 1 including the work machine 10 according to the present embodiment.

This procedure shares a lot of features with Example 1 described above. The duplicated parts therefore are omitted and the following describes steps 900 to 902 that are different from Example 1.

At step 900, the service request generation unit 110 of the controller 11 generates remote service request information 400 similarly to at step 202 of FIG. 2, and transfers it to the primary determination unit 120 (S900).

Next, the primary determination unit 120 of the controller 11 receives the remote service request information 400, and executes the primary determination of whether or not the remote service is executable similarly to at step 203 in FIG. 2 to create a first execution possibility and a first execution condition (S901). If the result of the primary determination shows that the remote service is executable, the primary determination unit 120 makes it as a new reception (S902→Yes), and transfers the first execution possibility and the first execution condition to the data center 12 via the communication terminal 101. Then, the procedure proceeds to step 204.

If the result of the primary determination shows that remote service is not-executable (S902→No), the primary determination unit 120 generates service execution information 600 containing the requested information 410, the execution possibility information 610 that contains the first execution possibility and second execution possibility that is no data and contains the result of the first execution possibility as the general determination of execution possibility, and the execution condition information 611 that contains the first execution condition and second execution condition that are no data, and transfers it to the service execution condition management unit 111. Then, the procedure proceeds to step 206.

Note that the primary determination unit 120 sets the determination standard setting information 500 in advance.

This embodiment allows the controller 11 alone to make a determination as to whether or not the state of the machine itself is appropriate without using the data center 12 prior to the execution of a remote service. If it is determined simply based on the state of the machine itself that the remote service is not-executable, the present embodiment immediately presents the execution possibility of the remote service not via the out-of-vehicle communication network 14. This further shortens the non-operating time of the work machine.

Other advantageous effects from the controller 11 and the remote service system 1 in this example are the same as those in Example 1, and their duplicated descriptions are omitted.

That is a detailed description of the embodiments of the present invention. The present invention is not limited to the above-stated embodiment, and the design may be modified variously without departing from the spirits of the present invention. For instance, the entire detailed configuration of the embodiment described above for explanatory convenience is not always necessary for the present invention. A part of one embodiment may be replaced with the configuration of another embodiment, or the configuration of one embodiment may be added to the configuration of another embodiment. A part of the configuration of each embodiment may include another configuration that is added, or may be deleted or replaced with another configuration.

REFERENCE SIGNS LIST

1 Remote service system
10 Work machine

11 Controller
11 Data center
12 Remote terminal
13 Out-of-vehicle communication network (first communication network)
100 Information control unit
101 Communication terminal
102 In-vehicle display input device
103 Display control unit
104 Vehicle control unit
105 Construction control unit
106 Engine control unit
107, 107a, 107b In-vehicle communication network (second communication network)
110 Service request generation unit
111 Service execution condition management unit
112 Communication performance management unit
113 Operating mode management unit
114 Operation information management unit
115 Communication terminal interface unit
116 In-vehicle communication interface unit
120 Primary determination unit
121 Secondary determination unit
122 Database
123 Data center communication interface unit
400 Remote service request information (service request information)
410 Requested information
411 Control mode information
412 Communication performance information
500 Determination standard setting information
600 Service execution information
610 Execution possibility information
611 Execution condition information
700 Output screen
701 Remote service request manipulation unit
702 Service provision information display unit

The invention claimed is:

1. A work machine including a controller that is connectable to a first communication network for a communication with outside of the work machine, the controller
generating service request information having: a function type corresponding to each of a plurality of remote service functions to remotely operate the work machine and refer to internal information of the work machine; an operating mode indicating an operation state of the work machine; and a first communication performance measured at the first communication network, and transferring the generated service request information to outside of the machine via the first communication network, and
receiving service execution information from outside of the machine via the first communication network, the service execution information having: execution possibility of a service function corresponding to a function type included in the service request information; a condition for the operating mode that permits execution of a service function corresponding to a function type included in the service request information; and a condition for communication performance that permits execution of a service function corresponding to a function type included in the service request information;
wherein the operating mode includes:
an internal control/external reference mode that enables the work machine to operate only by an instruction from inside of the work machine and enables only data reference of the work machine for an access from outside of the machine via the first communication network;
an internal control mode that enables the work machine to operate only by an instruction from inside of the work machine and disables access from outside of the machine via the first communication network when a detected available communication performance is less than a threshold standard; and
an external control mode that does not accept an instruction from inside of the work machine to operate the work machine and enables the work machine to operate only for an access from outside of the machine via the first communication network,
wherein the operating modes change only when a transition condition including a communication performance and a change in operating state of the work machine is met.

2. The work machine according to claim 1, wherein the controller includes:
a plurality of control units configured to control an input/output device and perform data processing;
a communication terminal that transmits and receives data via the first communication network;
a display input device having functions of screen output and manipulation input; and
a plurality of second communication networks configured to enable data transfer among the plurality of control units, wherein
at least one of the plurality of control units includes:
an operating mode management unit configured to manage the operating mode of the work machine;
a communication performance management unit configured to acquire and manage the first communication performance, and second communication performance measured based on a communication status of the second communication network;
a service request generation unit configured to generate and transfer the service request information to which the second communication performance is added; and
a service execution condition management unit configured to receive a service execution condition from outside of the machine, and confirm and manage the condition for executing the remote service function, wherein
the control units are connected to the communication terminal and the display input device via a connection line, via the second communication network, or via the second communication network and other control units, and outputs the service execution information via the display input device.

3. The work machine according to claim 2, wherein the control units further include
a primary determination unit that is connected to the service request generation unit and the service execution condition management unit, wherein
the primary determination unit receives service request information transferred from the service request generation unit, and for each function type included in the received service request information,
based on the condition for the operating mode preset for each function type of the remote service functions and the condition for communication performance, determines whether or not the remote service function is executable, finds first execution possibility, which is a result of determining whether or not the remote service function is executable, and a first execution condition, which is the condition used to determine whether or not the remote service function is executable and includes the condition for the operating mode that permits execution, and the condition for the communication performance that permits execution, and transfers the service request information, the first execution possibility, and the first execution condition to the first communication network.

4. The work machine according to claim 2, further comprising a connection unit with a data center configured to gather and store information transferred via the first communication network from a plurality of work machines and a remote terminal, wherein the data center includes:

a database configured to gather and store information transferred from the plurality of work machines via the first communication network, information transferred from the remote terminal via the first communication network, and environmental information on a status of communication infrastructure;

a primary determination unit configured to, for each function type included in the service request information transferred from the work machines via the first communication network, based on the condition for the operating mode preset for each function type of the remote service functions and the condition for communication performance, determine whether or not the remote service function is executable, and find first execution possibility, which is a result of determining whether or not the remote service function is executable, and a first execution condition, which is the condition used to determine whether or not the remote service function is executable and includes the condition for the operating mode that permits execution, and the condition for the communication performance that permits execution; and a secondary determination unit configured to, for each function type included in the received service request information, determine whether or not the remote service function corresponding to each function type included in the service request information is executable, based on a status of a work site obtained by referring to the database to find the status from the stored information therein, a status of a remote site obtained by referring to the database to find the status from the stored information therein, and environmental information of the communication infrastructure status; and find secondary execution possibility, which is a result of determining whether or not the remote service function is executable, and a secondary execution condition, which is a situation and a condition used to determine whether or not the remote service function is executable, wherein the data center includes the functions:

of generating service execution information having a function type included in service request information, execution possibility determined from the first execution possibility and the second execution possibility, and a condition for an operating mode and a condition for communication performance, which are generated from the first execution condition and the second execution condition, and of transferring the service execution information to the work machine, wherein the work machine exchanges the service request information and the service execution information with the data center.

5. The work machine according to claim 3, further comprising a connection unit with a data center configured to gather and store information transferred via the first communication network from a plurality of work machines and a remote terminal, wherein the data center includes:

a database configured to gather and store information transferred from the plurality of work machines via the first communication network, information transferred from the remote terminal via the first communication network, and environmental information on a status of communication infrastructure;

a primary determination unit configured to, for each function type included in the service request information transferred from the work machines via the first communication network, based on the condition for the operating mode preset for each function type of the remote service functions and the condition for communication performance, determine whether or not the remote service function is executable, and find first execution possibility, which is a result of determining whether or not the remote service function is executable, and a first execution condition, which is the condition used to determine whether or not the remote service function is executable and includes the condition for the operating mode that permits execution, and the condition for the communication performance that permits execution; and a secondary determination unit configured to, for each function type included in the received service request information, determine whether or not the remote service function corresponding to each function type included in the service request information is executable, based on a status of a work site obtained by referring to the database to find the status from the stored information therein, a status of a remote site obtained by referring to the database to find the status from the stored information therein, and environmental information of the communication infrastructure status; and find secondary execution possibility, which is a result of determining whether or not the remote service function is executable, and a secondary execution condition, which is a situation and a condition used to determine whether or not the remote service function is executable, wherein the data center includes the functions:
of generating service execution information having a function type included in service request information, execution possibility determined from the first execution possibility and the second execution possibility, and
a condition for an operating mode and a condition for communication performance, which are generated from the first execution condition and the second execution condition, and
of transferring the service execution information to the work machine,
wherein the work machine exchanges the service request information and the service execution information with the data center.

\* \* \* \* \*